United States Patent [19]
Rasmussen

[11] Patent Number: 5,487,592
[45] Date of Patent: Jan. 30, 1996

[54] HUB FOR BICYCLE WHEELS

[76] Inventor: Clark W. Rasmussen, 9584 Fermi Ave., San Diego, Calif. 92123

[21] Appl. No.: 56,352

[22] Filed: Apr. 30, 1993

Related U.S. Application Data

[63] Continuation-in-part of Ser. No. 844,516, Mar. 2, 1992, abandoned.

[51] Int. Cl.$^6$ .................................................. B60B 21/06
[52] U.S. Cl. ................................................ 301/59; 301/55
[58] Field of Search .......................... 301/55, 58, 59, 301/104, 110.5

[56] References Cited

U.S. PATENT DOCUMENTS

| | | | |
|---|---|---|---|
| 259,313 | 6/1882 | Jeffery | 301/59 X |
| 278,534 | 2/1983 | Gideon | 301/59 |
| 406,705 | 7/1889 | Crecelius | 301/59 |
| 473,837 | 4/1992 | Green | 301/59 |
| 549,740 | 11/1995 | McGlinchey et al. | 301/59 |
| 726,557 | 4/1903 | Mesnard | 301/59 |
| 792,725 | 1/1905 | Newton | 301/58 |
| 1,388,021 | 8/1921 | Budd | 301/59 |
| 2,037,871 | 4/1936 | Zander | 301/55 X |
| 3,428,376 | 2/1969 | Zeller | 308/190 |
| 4,505,315 | 3/1985 | Kaufeldt | 157/1.5 |
| 4,595,242 | 6/1986 | Wehmeyer | 301/6 |

FOREIGN PATENT DOCUMENTS

| | | | |
|---|---|---|---|
| 37087 | 4/1909 | Australia . | |
| 350734 | 4/1905 | France | 301/59 |
| 391497 | 8/1908 | France | 301/59 |
| 62733 | 7/1991 | Germany | 301/105 |
| 8503405 | 7/1987 | Netherlands | 301/55 |
| 15709 | of 1888 | United Kingdom | 301/55 |
| 11906 | of 1890 | United Kingdom | 301/55 |
| 3728 | of 1893 | United Kingdom | 301/55 |

*Primary Examiner*—Russell D. Stormer
*Attorney, Agent, or Firm*—Brown, Martin, Haller & McClain

[57] ABSTRACT

A hub shell comprises a hollow cylindrical body with a spoke flange and a hub head at each end. The spoke flange has a number of bores arranged radially around the flange perimeter, with the spacing and angle of the bores being dependent upon whether the hub is to be for a front wheel or a rear wheel. In every case, the bore is formed at an angle directed inward from the ends of the hub. The perimeter face of the hub flange is formed at the same angle as the bore so that the spoke exits the flange generally perpendicular to the perimeter face of the flange but angled with respect to the hub axis. Each bore has an inner thread which matches the thread pattern of the threaded end of a standard bicycle spoke. Both ends of the spoke will have the same outside thread so that either end may be inserted into the hub or into the spoke nipple at the wheel rim.

11 Claims, 2 Drawing Sheets

HUB FOR BICYCLE WHEELS

This is a continuation-in-part of application Ser. No. 07/844,516, filed Mar. 2, 1992, now abandoned.

BACKGROUND OF THE INVENTION

Other than flat tires, one of the most frequent "breakdowns" while bicycling is the result of broken spokes. In conventional bicycle wheels, spokes hook through holes in the hubs in a variety of lacing patterns with some spokes fed from outside the hub and others fed from inside the hub. The spokes are then tensioned by adjustment of the spoke nipples in the rim to center the rim on the hub. While a blow to the spoke near the rim may break the spoke, the most common breaking point is at the elbow where the spoke bends at the hub. It is well known that bends in metal create stress points and this stress clearly is evident in spoke breakage.

The trend in bicycle wheels is to decrease wind drag by any means possible. While disk wheels and tri-spoke wheels are available to minimize the drag surfaces, their prices can be prohibitive for the average bicyclist. An alternative to these specialized wheels is to use fewer standard spokes. This, however, introduces even greater risk of spoke breakage and distortion of the rim if a spoke breaks.

A number of patents have been issued for hub and spoke assemblies for wheels that are intended to improve the means for attaching the spokes to the hub. While a few are addressed specifically toward bicycle wheels, most claim to be applicable to any type of spoked wheel without recognizing the special requirements involved with bicycle wheels. Specifically, bicycle wheels are much lighter weight than spoked wheels for motor vehicles (cars, trucks, motorcycles) or wagon wheels, since the construction of these latter wheels does not usually need to address how much weight the wheels add to the total weight of the vehicle. Thus, large gauge wires can be used to guard against breakage. Further, the ratio of the spoke length to the rim or hub width is much greater on a bicycle than on, for example, a car wheel, so the stress on the bicycle spokes is proportionally greater. The problem of strain on the spokes becomes even more pronounced with ultra-lightweight materials from which the elite types of bicycles and components are made, such as carbon, graphite, titanium, etc.

In Austrian patent number 37087, issued Apr. 26, 1909, a method for attaching the spokes to the hub of a child's wagon wheel describes treatment for the threaded end of the spokes which attaches to the hub in order to avoid corrosion of the spokes within the hub. This method simply involves making the threaded portion of the spoke long enough to span the thickness of the hub wall, but not so long as to extend into the cavity at the center of the hub. The issues addressed are entirely separate from the concerns in constructing a bicycle wheel, and there is no recognition of a special way that the spokes must extend radially from the hub to minimize breakage.

German patent number 62733, issued Jul. 26, 1891, discloses ball bearings for bicycle wheels, but is of interest for the way in which the spokes are attached to the hub. Specifically, the spokes are screwed into the hub in such a way that they bend at the point of exit from the hub flange, which is apparent from the Figures. This bend is the point of highest stress on the spoke, and if, this configuration were attempted with the lightweight spokes on today's bicycles, the spokes would break as soon as any weight was placed on the wheel.

Configurations similar to the above German patent are found in U.S. Pat. Nos. 278,534 of Gideon (issued May 29, 1883), 473,837 of Green (Apr. 26, 1892), 726,557 of Mesnard (Apr. 28, 1903) and 792,725 of Newton (Jun. 20, 1905). Each of these patents describe, among other things, spokes which are threaded to be screwed into corresponding threaded holes in the hub flanges. However, none of these inventions recognizes a problem with or addresses the issue of stress on the spokes at the point of exit from the hub when the spokes are thin and relatively lightweight. If these wheels were at all successful, they were so because the spokes were so heavy that they could bear the stress without breaking.

In spite of the number of patents which disclose threaded spokes which screw into the hub, current bicycle wheels rely exclusively on a spoke design in which the inner end of the spoke is bent in a hook shape and threaded through an opening in the hub. It is clear that the threaded spoke configuration as taught by the prior art has failed to supplant the hooked spoke design in spite of the many drawbacks of the latter design. This failure is due to the lack of recognition of the critical role that built-in stresses plays on the wheel assembly.

SUMMARY OF THE INVENTION

It is an advantage of the present invention to provide a hub for bicycle wheels which virtually eliminates spoke breakage.

It is another advantage of the present invention to provide a hub which allows simplified machining of spokes.

A further advantage of the present invention is to provide a hub which permits assembly of a wheel using significantly fewer spokes with minimal risk of breakage.

In an exemplary embodiment, a hub shell comprises a hollow cylindrical body with a spoke flange and a hub head at each end. An annular recess is located at each end to retain a ring bearing which provides contact between the outer hub shell and the axle so that the hub shell rotates freely around the axle. The spoke flange has a number of bores arranged radially around the flange perimeter, with the spacing and angle of the bores being dependent upon whether the hub is to be for a front wheel or a rear wheel. In every case, the bore is formed at an angle directed inward from the ends of the hub. The perimeter face of the hub flange is formed at the same angle as the bore so that the spoke exits the flange generally perpendicular to the perimeter face of the flange but angled with respect to the hub axis. Since the front hub does not bear as much weight as the rear, it has an identical bore pattern on both flanges. The rear hub is not symmetrical, but has a wider flange on the side of the hub on which the freewheel will be mounted. This permits a staggered arrangement of bores in which the bores are formed radially at a shallow angle with respect to a tangent to the flange perimeter face so that two spokes will cross each other a short distance from the exit point from the flange. Each bore has an inner thread which matches the thread pattern of the threaded end of a standard bicycle spoke, typically 56 threads per inch. Both ends of the spoke will have the same outside thread so that either end may be inserted into the hub or into the spoke nipple at the wheel rim.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
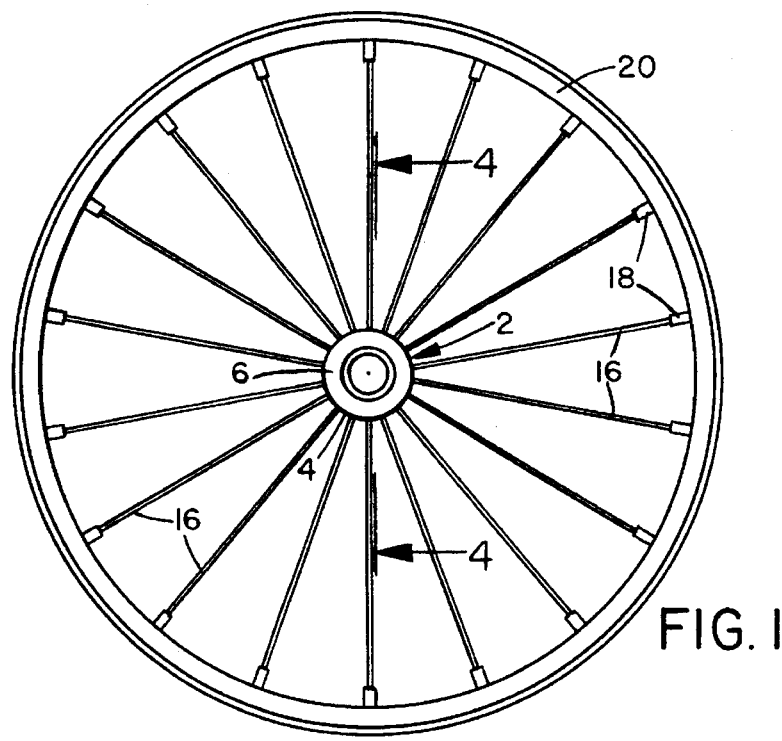
FIG. 1 is a side elevation view of a front wheel incorporating the hub.
Figure 2:
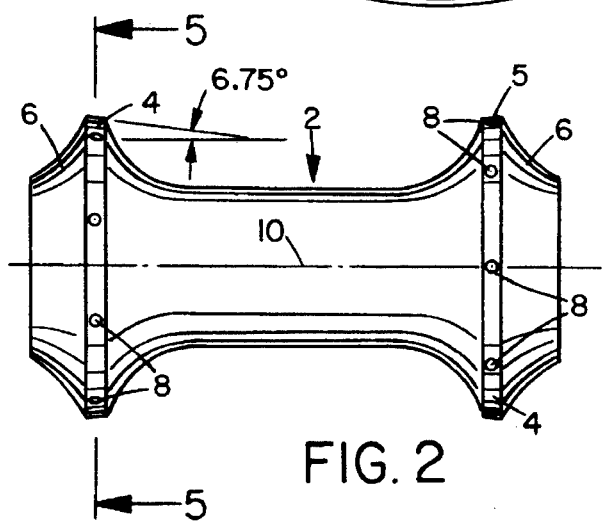
FIG. 2 is a top plan view of the front hub.

As illustrated in FIGS. 2–5, the front hub shell 2 is a hollow cylinder with a spoke flange 4 and a hub head 6 at each end. Spoke flange 4 has a perimeter face 5 which is angled inward toward a center line bisecting the hub shell. Bores 8 are evenly spaced around the perimeter face 5 of spoke flange 4 in a radial direction emanating from center axis 10, so that each bore 8 is generally perpendicular to the perimeter face 5 at the location of the bore 8. Since the perimeter face itself is angled, the bores 8 are also angled with respect to a line perpendicular to the center axis 10. Bores 8 are machined with an inner thread 12 with which the outer thread of spoke 16 mates. Spoke 16 attaches at its other end to spoke nipple 18 which holds spoke 16 at the rim 20.

At each end of hub shell 2, an annular recess 22 which is centered at the axis 10 is provided for retaining bearing ring 24 to provide rotating attachment of axle 26, as is known in the art.

Figure 3:
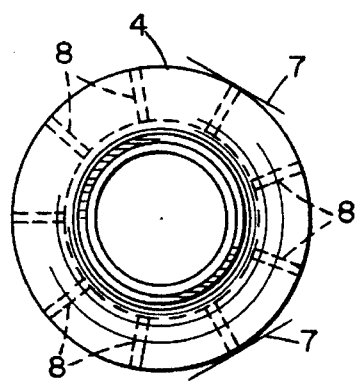
FIG. 3 is an end view of the hub.
Figure 4:
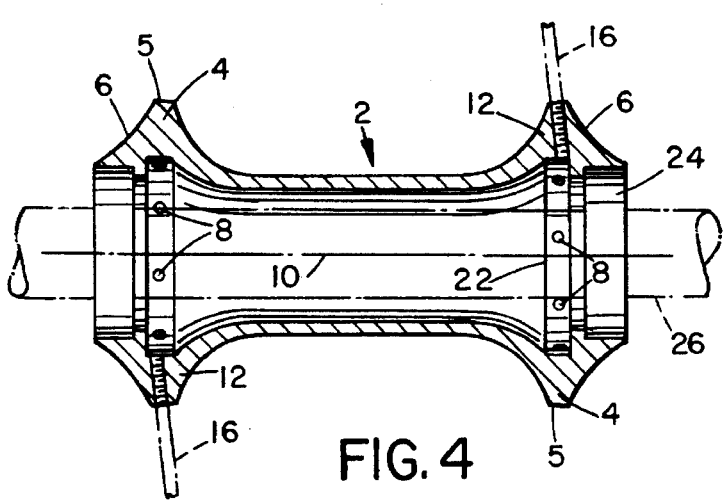
FIG. 4 is a sectional view taken on line 4—4 of FIG. 1.
Figure 5:
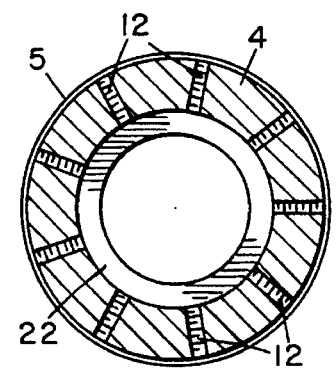
FIG. 5 is a sectional view taken on line 5—5 of FIG. 2.
Figure 6:
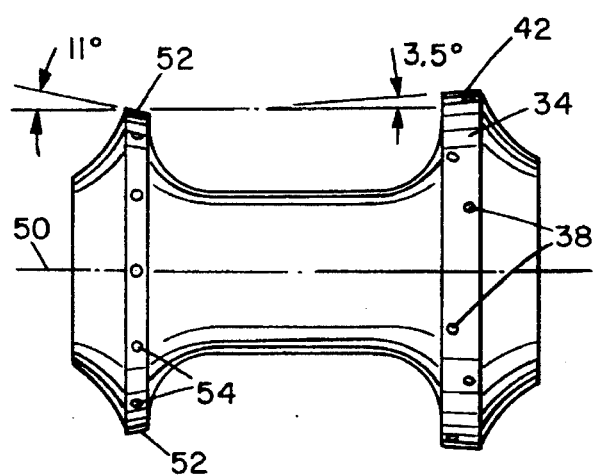
FIG. 6 is a top plan view of the rear hub.

A critical aspect of the front hub is the angle at which the bores 8 are formed in the flange 4. In the preferred embodiment, the typical angle from a line perpendicular to the center axis 10 is 6.75°. In order to avoid stresses that can result from bending of the spoke upon exit, the bore angle should not vary more than ±1°. The perimeter face 5 is formed at an angle 6.75°±1° from the center axis$^{10}$. As illustrated in FIG. 3, the bores emanate radially from the center, generally perpendicular to a tangent 7.

The rear hub has a different design from the front hub since the rear wheel bears most of the rider's weight and because the freewheel must be attached on one end of the hub. This is the location where a large percentage of spoke breakage occurs.

Figure 7:
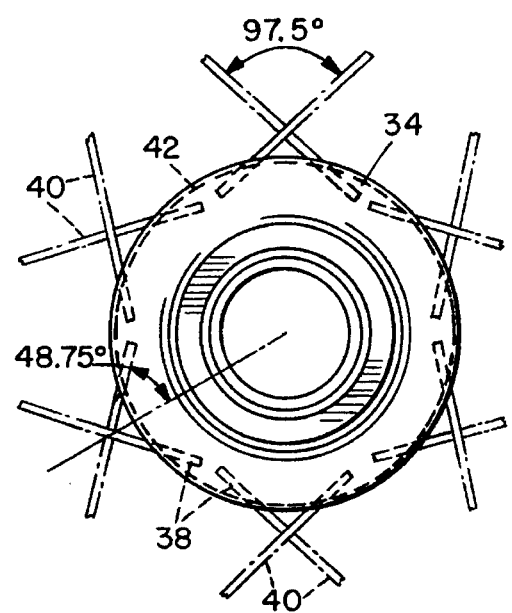
FIG. 7 is an end view of the freewheel side of the rear hub with spokes installed.

On the side of the hub on which the freewheel is mounted, spoke flange 34 is slightly widened to permit staggered placement of bores 38, as illustrated in FIG. 7. While the same number of spokes 40 (12) are used as on the other side, the staggered arrangement on the freewheel side allows the spokes 40 to exit the flange at shallow angles to lessen shearing forces on the spokes. The typical radical bore angle is 48.75° from a line running diametrically across the center of the hub at the point of exit from the flange 34. The two adjacent spokes 40 will cross each other shortly after exiting the flange to form an angle of 97.5°. The flange perimeter face 42 is angled inward at a 3.5° angle (±1°) from the center axis 50. The bores 38 are also formed at 3.5°±1° angles from perpendicular to center axis 50.

Figure 8:
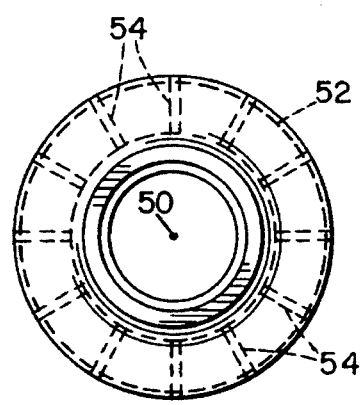
FIG. 8 is an end view of the non-freewheel side of the rear hub with spokes installed.

On the side of the hub opposite the freewheel, the spoke pattern is similar to that of the front hub, as shown in FIG. 8. The flange perimeter face 52 is angled at 11°±1° from the center axis 50, and the bores 54 are similarly at 11°±1° from a perpendicular to the center axis.

The above-described angles are key to the successful avoidance of spoke breakage. In the prior art efforts to attach spokes to the hubs by screwing in the spokes, the stresses on the spoke at the point of exit from the flange have been unrecognized as a problem. While the failure to make provisions for these stresses has not significantly affected uses of such designs where the spokes were relatively thick and heavy, the problem of spoke breakage on lightweight bicycle wheels was not successfully addressed before the present invention. In order to assure that there is no bending of the spoke at the point of exit from the flange, the bore angles should be closely controlled within the above tolerances. Deviation from these ranges can cause excessive strains upon the spokes, leading to increased risk of breakage, even more so than traditional bent spoke configurations.

The standard spoke machining procedure according to the prior art involves cutting a size 56 thread (56 threads per inch) into the end of the spoke which will attach to the spoke nipple at the rim. The other end is bent to create a hook which will be laced through openings in the sides of the hub flange. For installation, the bent end is laced through the opening then the threaded end is placed in contact with the spoke nipple. Using a spoke tool, the spoke and spoke nipple are screwed together to create a desired tension between the hub and the rim.

According to the present invention, size 56 threads (0.0940–56) (or whatever the applicable standard is) are cut into both ends of the spoke. One end is screwed firmly into the bore of the hub shell and the other end is attached in the same manner as above.

According to the present invention, the use of spokes is very efficient so that fewer spokes are required. In the exemplary illustration of a front hub, each spoke flange 4 has nine bores 8 so that eighteen spokes are used on the wheel. (Typical wheels use 32 spokes.) In the rear hub, each spoke flange has 12 bores so that twenty-four spokes are used. This provides a benefit with respect to aerodynamics by reducing the wind drag on the spokes. Since the spokes are all centered at the hub flange, i.e., they do not extend beyond the plane of the hub flange, there is decreased chance of breakage because the spokes are not as exposed as in the prior art design. The hub shell is also lighter than a prior art hub since it does not require the large diameter hub flange necessary to enable spoke lacing.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A hub shell for a spoked bicycle wheel comprising:

a hollow, generally-cylindrical body having a spoke flange with a perimeter face and a hub head at each end thereof and an axis running through a center of said body, said perimeter face being angled inwardly with respect to said axis wherein said spoke flange on one end of said body is wider than said spoke flange on the other end of said body;

an annular recess at each said end for retaining a bearing means; and a plurality of bores distributed radially around said spoke flange directed inwardly at an angle from said spoke flange, said bores having internal threads for mating win an external thread of a spoke wherein said spoke is threaded at both ends, a first end for attachment to said hub head and a second end for attachment at a rim of said bicycle wheel, wherein said plurality of bores on the one end of said spoke flange is positioned around said perimeter face in a staggered arrangement and said angle is 3.5°±1°.

2. A hub shell as in claim 1 wherein said internal threads have a same thread size as an attachment means at said rim.

3. A hub shell as in claim 2 wherein said same thread size is 56 threads per inch.

4. A hub shell as in claim 1 wherein said non-zero angle of said plurality of bores on said other end is 11°±1°.

5. A hub shell as in claim 1 wherein said angle of said plurality of bores is 6.75°±1°.

6. A hub shell as in claim 1 wherein each of said plurality of bores on said one end is further disposed at a radial angle of 48.75°±1° from a line running diametrically across said spoke flange.

7. A rear hub shell for a bicycle wheel with a plurality of spokes which are threaded at both ends, a first spoke end for attachment to said hub head and a second spoke end for attachment at a rim of said bicycle wheel, said rear hub comprising:

a hollow, generally-cylindrical body having a first spoke flange with a first perimeter face and a first hub head at a first end thereof and a second spoke flange with a second perimeter face and a second hub head at a second end thereof and an axis running through a center of said body, said first perimeter face being wider than said second perimeter face and each of said first and second perimeter faces being angled inwardly with respect to said axis;

an annular recess at each of said first end and said second end for retaining a bearing means;

a first plurality of bores distributed radially around said first spoke flange directed inwardly at a first angle from said first spoke flange, said first plurality of bores having internal threads for mating with an external thread of said first spoke end, said first plurality of bores being disposed in a staggered arrangement; and a second plurality of bores distributed radially around said second spoke flange directed inwardly at a second angle from said second spoke flange, said second plurality of bores having internal threads for mating with an external thread of said first spoke end.

8. A rear hub shell as in claim 7 wherein said first angle of said first plurality of bores is 3.5°±1°.

9. A rear hub shell as in claim 7 wherein said second angle of said second plurality of bores is 11°±1°.

10. A rear hub shell as in claim 7 wherein a thread size at both ends of said spoke is 56 threads per inch.

11. A rear hub shell as in claim 7 wherein each of said first plurality of bores is further disposed at a radial angle of 48.75°±1° from a line running diametrically across said first spoke flange.

* * * * *